(12) United States Patent
Tsarev

(10) Patent No.: US 6,999,639 B2
(45) Date of Patent: Feb. 14, 2006

(54) TUNABLE OPTICAL FILTERS

(75) Inventor: Andrei Vladimirovich Tsarev, Novosibirsk (RU)

(73) Assignee: Gilad Photonics Ltd., Doar Na Lachish (IL)

( * ) Notice: Subject to any disclaimer, the term of this patent is extended or adjusted under 35 U.S.C. 154(b) by 111 days.

(21) Appl. No.: 10/488,443

(22) PCT Filed: Sep. 5, 2002

(86) PCT No.: PCT/IL02/00742

§ 371 (c)(1),
(2), (4) Date: Mar. 3, 2004

(87) PCT Pub. No.: WO03/021315

PCT Pub. Date: Mar. 13, 2003

(65) Prior Publication Data

US 2004/0247221 A1    Dec. 9, 2004

(30) Foreign Application Priority Data

Sep. 6, 2001  (IL) .................................... 145320

(51) Int. Cl.
*G02F 1/035*       (2006.01)
(52) U.S. Cl. .................... 385/3; 385/14; 385/130; 385/131; 385/132
(58) Field of Classification Search ............ 385/14, 385/24, 3, 37, 40, 42, 129, 130, 131, 132; 398/82, 85

See application file for complete search history.

(56) References Cited

U.S. PATENT DOCUMENTS

| | | | |
|---|---|---|---|
| 4,679,893 A | 7/1987 | Ramer | 385/14 |
| 5,425,116 A | 6/1995 | Dragone et al. | 385/24 |
| 5,559,906 A | 9/1996 | Maerz | 385/3 |
| 5,629,992 A | 5/1997 | Amersfoort et al. | 385/15 |

(Continued)

FOREIGN PATENT DOCUMENTS

EP     1 318 418 A1    6/2001    ............ 385/14 X (Continued)

OTHER PUBLICATIONS

Lam, Jane and Zhao, Liang, "Optical Integration is Rising to Meeting Growing Bandwith Demand", WDM Solutions, Oct. 2000, www.optoelectronics-world.com.

(Continued)

*Primary Examiner*—Brian M. Healy
(74) *Attorney, Agent, or Firm*—Edwards Angell Palmer & Dodge LLP; Scott D. Wofsy

(57) ABSTRACT

An integrated optical filter device that is tunable with a narrow linewidth and fast operation, and that can be configured to perform a number of filtering functions, including pass-through and multi-channel drop functions, redirecting optical radiation of different wavelengths into different optical channels. The filter device is easy to fabricate inexpensively and reliably using existing technology and is compact and more densely packed than devices produced by the prior art, even for low refractive index materials, in that it uses substantially straight rather than curved strip optical waveguides. Wavelength tuning can be accomplished by means of a number of alternative control arrangements and configurations.

34 Claims, 6 Drawing Sheets

Tunable Optical Filter

U.S. PATENT DOCUMENTS

| | | | |
|---|---|---|---|
| 5,748,811 A | 5/1998 | Amersfoort et al. | 385/15 |
| 5,818,980 A | 10/1998 | Herrmann | 385/11 |
| 5,838,844 A | 11/1998 | Van Dam et al. | 385/14 |
| 5,862,279 A | 1/1999 | Amersfoort et al. | 385/48 |
| 5,915,051 A * | 6/1999 | Damask et al. | 385/16 |
| 5,937,113 A | 8/1999 | He et al. | 385/11 |
| 6,035,080 A * | 3/2000 | Henry et al. | 385/24 |
| 6,047,096 A | 4/2000 | Augustsson | 385/37 |
| 6,049,640 A | 4/2000 | Doerr | 385/15 |
| 6,141,467 A | 10/2000 | Doerr | 385/24 |
| 6,212,315 B1 | 4/2001 | Doerr | 385/31 |
| 6,219,471 B1 | 4/2001 | Doerr | 385/15 |
| 6,222,964 B1 * | 4/2001 | Sadot et al. | 385/40 |
| 6,825,966 B1 * | 11/2004 | Webb et al. | 359/279 |

FOREIGN PATENT DOCUMENTS

| | | | |
|---|---|---|---|
| EP | 1 316 839 A1 | 6/2003 | 385/14 X |
| WO | WO 98/33335 | 7/1998 | 385/14 X |
| WO | WO 00/31583 | 6/2000 | 385/14 X |
| WO | WO 01/01193 | 1/2001 | 385/14 X |
| WO | WO 01/27689 | 4/2001 | 385/14 X |
| WO | WO 01/41347 | 6/2001 | 385/14 X |

OTHER PUBLICATIONS

Smit, Meint K., "Advanced Components For WDM", ECOC '99, Sep. 26-30, 1999, Nice, France.

Tsarev, Andrei et al., "The Multiple Channel Acoustooptic Tunable Filter with Super Narrow Optical Linewidth Based Onthe Set of Multi-Reflector Beam Expanders", 11th European Conference on Integrated Optics ECIO'03, P23 (104).

Tsarev, Andrei et al. "The New Architecture of Thermostable Acoustooptic Tunable Filter with Super Narrow Optical Linewidth and Low Sidelobe Level", 15th Annual Lasers and Eletro Optics Society Meeting, Nov. 10-14, 2002, Glasgow, Scotland.

Tsarev, Andrei, "A new type of small size acousto-optic tunable filter with super narrow optical linewidth", Appl. Phys. B73, 495-498, 2001.

Lam, Jane and Zhao, Liang, "Optical Integration is Rising to Meeting Growing Bandwidth Demand", PennWell, http://lw.pennnet.com/Articles/Article_Display.cfm?section=ARCHi&Subsection=Display&Article_ID=93884&KEYWORD=zhao&p=51.

* cited by examiner

TUNABLE OPTICAL FILTERS

FIELD OF THE INVENTION

The present invention relates generally to optical devices and, more specifically, to integrated optical filters.

BACKGROUND OF THE INVENTION

Modern communication is increasingly based on optical networks. The complexity of emerging networks required in internet applications, for example, with tens, if not hundreds, of channels, demands integrated optical devices produced on materials such as silicon using tools and techniques from the semiconductor industry, as opposed to devices fabricated from discrete optical components. This is demonstrated by Meint K. Smit in his article, "Advanced components for WDM," ECOC'99, 26–30 September, Nice, France, v. I, pp. 98–99, included herein by reference. In this article, Smit presents Arrayed Waveguide Gratings (AWGs), also known as Phase Arrays (PHASARs) or Waveguide Grating Routers (WGRs), whose purpose is to perform filtering of a selected wavelength of an optical spectrum. In these devices, light is directed via an input strip waveguide to a lens region which distributes it among a large number of individual curved strip optical waveguides that make up the grating array. These optical waveguides are fabricated so that each has a precise difference of length relative to neighboring waveguides, thereby producing a phase delay in the light emerging therefrom. When all the emerging light is recombined by a second lens region which focuses it onto a second, output, waveguide array, the superposition of the phase-shifted light beams for different wavelengths results in light being sorted by wavelength among the waveguides of the output array. Currently produced devices filter optical radiation into 64 channels spaced apart by 0.4 nm or 50 GHz, with 128 or even 256 channel devices under development.

It is worth noting, however, that the manufacturing tolerances for a multiplicity of curved strip optical waveguides are highly demanding even by the standards of the semiconductor industry and put severe constraints on the choice of materials for such devices and on their physical dimensions. For example, the index of refraction must be uniform to within 100 ppm. Devices produced from silica on silicon have small losses for optical coupling with optical fibers, but the index of refraction for the waveguides is in a range that requires large size devices, on the order of 10 cm, in order to produce the required phase differences. Semiconductors, such as InP, allow devices on the order of 1 cm, but are difficult to couple with optical fibers. Thus, these devices are large or complex, and are costly. Further limitations are that they are not tunable with respect to the selected optical wavelengths, and that they require two AWG stages to produce full add/drop optical filter functionality.

U.S. Pat. No. 6,141,467 to Doerr discloses a "Wavelength-Division-Multiplexing Programmable Add/Drop Using Interleave-Chirped Waveguide Grating Router," included herein by reference, that has many of the features described by Smit, but is also tunable by means of phase shifters which selectably change the index of refraction in a portion of the strip waveguides. However, except for the addition of tunability and other additional features, the disclosed device still has the other disadvantages of the devices described by Smit.

U.S. Patent to Herrmann discloses a "Polarization-Independent, Tunable, Integrated Acousto-Optical Waveguide Device for the Wavelength Selection of an Optical Signal" in which wavelength filtering of the optical input to the device is accomplished through acousto-optic conversion, by a surface acoustic wave (SAW), of the different polarization modes of the light propagating collinearly with the SAW in the strip optical waveguide. The add/drop optical filter functionality is provided by polarizing beam splitters which are based on the coupled strip optical waveguides. However, the device disclosed cannot provide narrow enough linewidth due to the value of optical anisotropy and length of interaction area, without significantly increasing the device size. For example, an acousto-optic tunable filter produced on a lithium niobate substrate that is 6.8 cm long has a linewidth of about 2 nm (on a level 0.5) for a wavelength of about 1.5 microns. The device is further limited in that it cannot reassign different optical wavelengths to different optical channels.

A more advanced "Acoustooptic Tunable Filter" has been proposed by the present inventor in PCT application PCT/RU01/00160, included herein by reference, which includes a straight input strip optical waveguide with a multiplicity of tilted reflectors to expand the input beam into a number of reflected beams in a planar or film waveguide, which are then recombined by means of a second set of tilted reflectors along a straight output strip optical waveguide. Surface acoustic waves (SAW) of varying frequency are excited in the planar waveguide which are non-collinear with the beams therein and which periodically vary the index of refraction of the planar waveguide, thereby selecting which specific wavelengths of the optical beams are recombined along the output strip optical waveguide to be passed by the filter. However, the planar waveguide configuration reduces the potentially high efficiency of the filtered optical beam due to the inherent inefficiency of the acousto-optic interaction, requiring high power consumption, and due to the loss of optical energy in the spacing between channels and reflectors that is inherently part of a planar waveguide, so that it never reaches the output strip optical waveguide.

U.S. Pat. No. 5,559,906 to Maerz discloses an "Optical Arrangement of a Strip-shaped Optical Waveguide," included herein by reference, which includes a number of curved strip waveguides of different lengths of which one or more have a controllable phase shifting arrangement. Phase shifting is accomplished by changing the index of refraction of portions of the curved strip waveguides by one of the following: the electro-optical effect, charge carrier injection, or the thermo-optical effect. In order to vary the phase shift from channel to channel, the electrodes used to induce the change in the index of refraction of the strip waveguides that make up the channels differ in optical length from channel to channel. As with Smit above, the manufacturing tolerances for a multiplicity of curved strip optical waveguides are highly demanding even by the standards of the semiconductor industry, and the addition of individual electrodes of precise, different lengths for each strip waveguide makes this requirement even more demanding. Further, in the disclosed arrangement, beam expansion to distribute beams among the channels and beam recombination from the channels is accomplished by means of a film or planar waveguide (See FIGS. 2 and 3 and claims 8 and 9, therein) which requires a large device size to eliminate the problem of cross talk between channels.

SUMMARY OF THE INVENTION

The present invention seeks to provide an integrated optical filter device that is tunable with a narrow linewidth and fast operation, and that can be configured to perform a number of filtering functions, including pass-through and multi-channel drop functions, as well as redirecting optical radiation of different wavelengths into different optical channels. The present invention further seeks to provide devices that are easy to fabricate inexpensively and reliably using existing technology, and that are compact and more densely packed than those produced by the prior art, even for low refractive index materials.

There is thus provided, in accordance with a preferred embodiment of the invention, an integrated optical filter device including:

an optical inlet including an input strip optical waveguide arranged to receive an entering optical beam and a beam distributor in association with the optical inlet to divide the entering optical beam into beamlets each having a portion of the energy thereof;

a processing array including a multiplicity of discrete optical channels arranged in association with the beam distributor so that each of the optical channels receives one beamlet of the optical beam therefrom, and wherein each of the optical channels includes a substantially straight, tuning strip optical waveguide and a phase shift arrangement to selectably induce a preselected phase shift in optical waves as they traverse the optical channel;

one or more optical outlets, each optical outlet including a beam consolidator to combine beamlets of an optical beam from the channels of the array into an output optical beam and an output strip optical waveguide in association with the beam consolidator to receive the output optical beam therefrom and to direct it outwards;

wherein the beam distributor and the channels of the processing array, together with the beam consolidator of one of the optical outlets, are so arranged as to cause superposition of the phase-shifted optical waves of beamlets of an optical beam from the channels of the processing array in the output strip optical waveguide of one of the optical outlets, the superposition, as a result of the phase shifts induced in the optical waves by the phase shift arrangement, selecting portions of the optical beam having with wavelengths within a predetermined range and combining them into an output optical beam in the output strip optical waveguide of one of the optical outlets.

Additionally in accordance with a preferred embodiment of the invention, the beam distributor and consolidators are sets of tilted elementary reflectors overlapping the aperture of the strip optical waveguides, which may have varying coefficients of reflection along the length thereof, of generally higher values near its center and decreasing to lower values towards its ends and which may be arranged at varying intervals. The elementary reflectors may be tilted at an angle nearly 45 degrees, or in some cases, at an angle of nearly 22.5 degrees with respect to the axis of their respective strip optical waveguides. In accordance with an alternative preferred embodiment of the invention, the elementary reflectors may be made up of groups of reflector strips.

Further in accordance with a preferred embodiment of the invention, the optical outlets are arranged in a sequence along the path of the optical beam, and the processing array is divided into stages wherein each stage is associated with one the optical outlets. In each member of the sequence of optical outlets the beam consolidator is substantially a mirror image of the beam distributor of the optical inlet, though in the last optical outlet of the sequence of optical outlets, the set of tilted elementary reflectors of the beam consolidator may alternatively be substantially parallel to the set of tilted elementary reflectors of the beam distributor.

Additionally in accordance with a preferred embodiment of the invention, the phase shift arrangements of the channels of the processing array include control electrodes arranged in association with and along the tuning strip optical waveguides, substantially along the full length or along varying partial lengths thereof, and these electrodes may be connected individually or in pairs to the channels of a tunable multi-channel voltage source. The strip optical waveguides may be joined in groups, wherein control electrodes may be arranged in association with all the members of some of the groups. The phase shift arrangements may induce the phase shifts via the electro-optical effect, the thermo-optical effect, or the injection of charge carriers; in each case, the strip optical waveguides being fabricated of a suitable material for the respective effect or method.

In accordance with an additional embodiment of the invention, the optical inlet and/or one or more of the optical outlets further include similarly functioning phase shift arrangements in association with the respective input and/or outlet strip optical waveguides. The phase shift arrangements include electrodes associated and arranged with the respective input and/or outlet strip optical waveguides in a manner similar to those of the tuning strip optical waveguides.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figure 1:
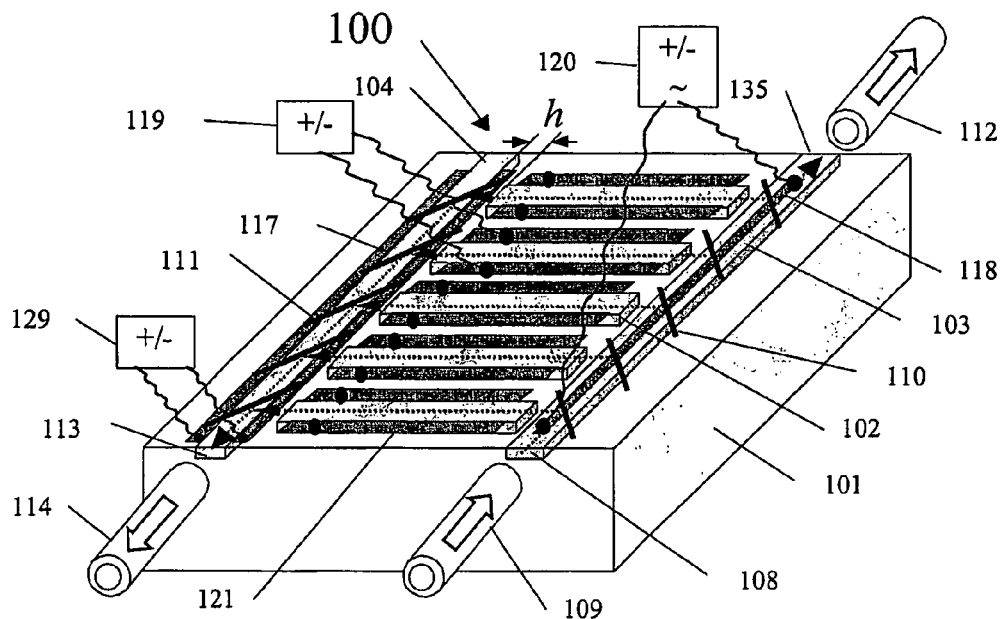
FIG. 1 is a representation of an integrated optical filter device having a single optical outlet, constructed and operative in accordance with a preferred embodiment of the present invention.

Referring now to FIG. 1, there is shown a schematic representation of an integrated optical filter device, referred to generally as 100, constructed and operative in accordance with a preferred embodiment of the present invention. Optical filter 100 is fabricated on a surface of a solid-state substrate 101, or alternatively, under it (referred to as the buried waveguide case, which is not shown), of a series of thin strips 102, 103, and 104 of light conducting material having a refractive index greater than that of the adjacent substances, namely, substrate 101 and the air. Such strips will function as strip optical waveguides, so that a narrow and non-divergent light beam can propagate along their length with very low losses (less than 1 dB/cm). Different light propagation modes, which are supported by the waveguide geometry, and their optical fields may be determined by local variation of the refractive index across depth and width of the waveguide structure. Optical filter 100 further includes various electrode structures 117, 118, and 121 which may be advantageously used to control light energy flow through optical filter 100, giving rise to the optical filtering function, as will be explained below. The strip waveguides 102, 103, and 104, with their specified optical properties, and the electrode structures 117, 118, and 121 can be manufactured using technology and methods well known in the semiconductor industry.

An optical beam from optical fiber 109 enters optical filter 100 via inlet window 108, by edge coupling with optical fiber 109, beam focusing on window 108, or other suitable means, and propagates along the length of input strip optical waveguide 103. Input strip optical waveguide 103 has, along its length a number of elementary reflectors 110 tilted at a preselected angle with respect to the strip waveguide 103 axis, and these reflectors overlap its aperture and serve as a beam splitter working similarly to the beam expander as taught in PCT application number PCT/RU01/00129, "The Beam Expander," to the present inventor, included herein by reference.

Figure 13:
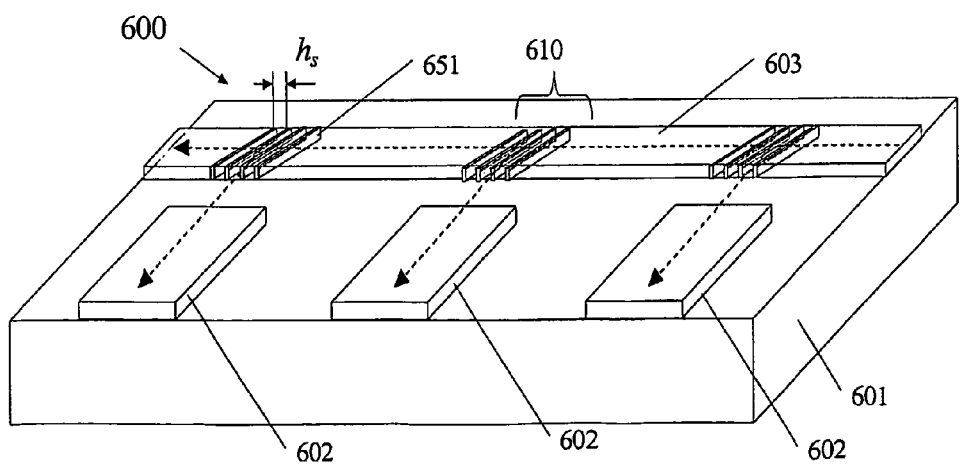
FIG. 13 is a schematic representation of a detail of an integrated optical filter device, similar to the device of FIG. 1, constructed and operative in accordance with an alternative preferred embodiment of the present invention.

Elementary reflectors 110 may each be made up of a group of reflector strips with optical properties that differ from those of strip optical waveguide 103. Referring now briefly to FIG. 13, there is shown a schematic representation of a detail of an integrated optical filter device, referred to generally as 600, similar to device 100 in FIG. 1, constructed and operative in accordance with an alternative preferred embodiment of the present invention. Integrated optical filter device 600 has strip optical waveguides 603 and 602 fabricated on substrate 601. In the present embodiment, strip optical waveguide 603 includes a number of elementary reflectors 610 which are each made of a group of reflector strips 651. Reflector strips 651 may be fabricated as localized changes in the index of refraction of the strip waveguide or as grooves on the waveguide surface. As is known in the art, a group of strips, typically up to four strips, will be fabricated with a spacing $h_s$ of half a wavelength of the desired light as it is propagated in the strip waveguide. This will provide constructive interference of the reflected optical beam with small disruption of the optical properties of the waveguide and minimal scattering losses. Elementary reflectors 610 may also advantageously be fabricated as a series of Bragg gratings, each made up to resemble a group of strips spaced at half a wavelength of the desired light as it is propagated in the strip waveguide, each configured so that a preselected small portion of the light energy is reflected, and the remaining portion propagates to the next Bragg reflector grating.

Returning again to FIG. 1, elementary reflectors 110 distribute preferably most of the light energy from the optical beam, in the form of a series of narrow light beams, among a series of optical channels, each including a substantially straight tuning strip optical waveguide 102 and a phase shift arrangement which, in the present embodiment, is made up of one or two electrodes 121 running along the length of tuning strip optical waveguide 102, and these electrodes are connected to a suitable multi-channel voltage source 119. At the ends of tuning strip optical waveguides 102, the light beams are recombined into one optical beam in output strip optical waveguide 104 by means of a series of elementary reflectors 111 along its length which overlap the aperture of output strip waveguide 104. Elementary reflectors 111 and output strip optical waveguide 104 are essentially an inverted version of the beam expander, made up of input strip optical waveguide 103 and elementary reflectors 110, and reflectors 111 serve the inverted function to combine or consolidate the light beams from tuning strip optical waveguides 102 into one optical beam, as taught in PCT application number PCT/RU01/00160, "Acoustooptic Tunable Filter," to the present inventor, included herein by reference. The optical beam leaves optical filter 100 via outlet window 113 and continues to propagate along optical fiber 114.

It should be noted that the spacing, h, between the ends of tuning strip optical waveguides 102 and output strip optical waveguide 104 can be determined, according to principles known in the art; based on the relative values of the indices of refraction of the waveguides 102 and 104 and their dimensions, and the index of refraction of substrate 101 and that of air; in order to optimize optical transmission between tuning strip optical waveguides 102 and output strip optical waveguide 104 and to minimize losses. In the case wherein the refractive index of tuning strip optical waveguides 102 is less than that of output strip optical waveguide 104, h can go to zero, and they can simply connect or intersect each other, with the light beams passing with negligible losses.

It should be further noted that a predetermined, preferably small, portion of the original optical beam in input strip optical waveguide 103 will not be deflected by elementary reflectors 110 and will continue along its length and exit into optical fiber 112 whereby it may be routed to a suitable detector (not shown) to allow generation of a signal to control the level of intensity of the input beam.

As will be explained below, the relative dimensions of the various components of optical filter 100, their layout, other characteristics such as the tilt angle of elementary reflectors 110 and 111, are set so that the phase difference for any two light beams routed through two different tuning strip optical waveguides 102 will be essentially 2π for a preselected wavelength of light. This results in constructive interference for the desired or working wavelength at the superposition point in output strip optical waveguide 104, after all the light beams from all the optical channels have been routed therein. This also results in largely destructive interference for other wavelengths, decreasing their transmission by several orders of magnitude. This is the mechanism whereby the filtering function of optical filter 100 is achieved. Electrodes 121 change the index of refraction of tuning strip optical waveguides 102 by one or more of a number of known physical effects, thereby changing the value of the wavelength which will undergo constructive interference, and thereby tuning optical filter 100 to a different wavelength. In order to enhance the tuning function of optical filter 100, input strip optical waveguide 103 and output strip optical waveguide 104 may also have their associated control electrodes 118 and 117 respectively and their associated voltage sources 120 and 129 respectively.

The filtering and tuning functions of devices such as the present invention are explained in further detail in U.S. Pat. No. 5,559,906 to Maerz, "Optical Arrangement of a Strip-shaped Optical Waveguide," included herein by reference.

Figure 2:
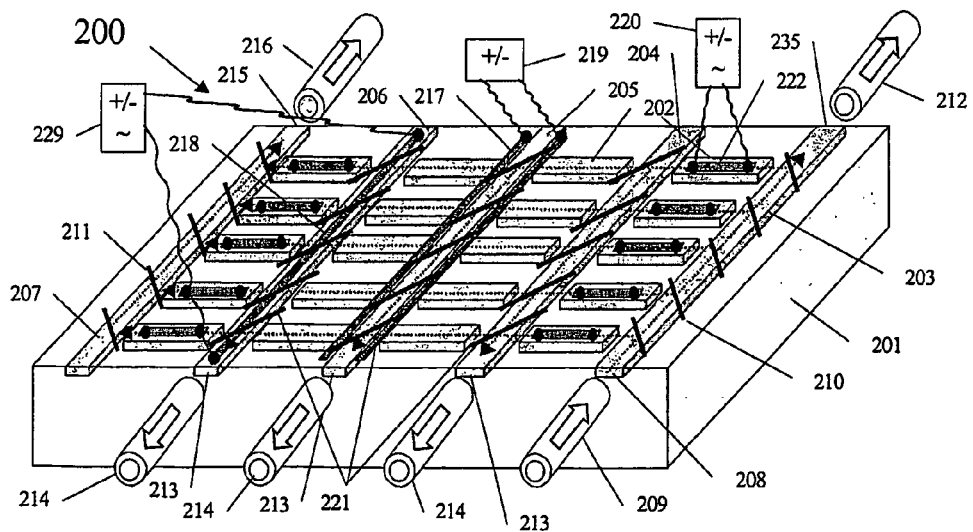
FIG. 2 is a representation of an integrated optical filter device having multiple optical outlets, constructed and operative in accordance with a further preferred embodiment of the present invention.

With regards to reference numbers, similar items in the figures have been given numbers with identical suffixes as those in FIG. 1; i.e. 235 is similar to 135, and therefore the description of these items and their function will not be repeated. Referring now to FIG. 2, there is shown a schematic representation of an integrated optical filter device, referred to generally as 200, constructed and operative in accordance with a further preferred embodiment of the present invention. Optical filter 200 is similar in function and many details to optical filter 100 of FIG. 1 with the addition that it has a number of output strip optical waveguides 204, 205, 206, and 207, each with its outlet window 213 and 215 and its associated optical fiber 214 and 216. This multiple output capability allows the present embodiment to function as a multi-channel narrow-band optical filter. Further, the orientation of the sets of elementary reflectors 221 and 211 of the output channels allows the filtering function of the individual channel to be determined. When elementary reflectors 221 of output strip optical waveguides 204, 205, and 206 are tilted at an angle opposite to that of elementary reflectors 210 of input strip optical waveguide 203, the channel can perform the "drop" function; and when elementary reflectors 211 of output strip optical waveguide 207 are tilted at an angle substantially parallel to that of elementary reflectors 210 of input strip optical waveguide 203, the channel can perform the "pass-through" function.

For the case of two electrodes on either side of strip optical waveguides, such as electrodes 121 with tuning strip optical waveguides 102, as shown in FIG. 1, using a DC voltage source 119 connected to the electrode 121 pair will apply an electrostatic field across tuning strip optical waveguides 102, thereby inducing a local change in the refractive index therein by the known electro-optical or electrostriction effect, thereby changing the phase shifts in the optical channels and allowing controlled tuning of the working wavelength of optical filter 100. Where a single electrode 222 runs along each of tuning strip optical waveguides 202, as shown in FIG. 2, an AC voltage source 220 or a DC voltage source (not shown) connected to the ends of electrode 222 will heat tuning strip optical waveguides 202 thereby inducing a local change in the refractive index therein by the known thermo-optical effect, again allowing controlled tuning of the working wavelength of optical filter 200. Other known physical effects, such as the photo-chromic effect or charge carrier injection may also be used to induce local changes in the refractive index of the strip waveguides to enable the tuning of the optical filter.

Figure 3:
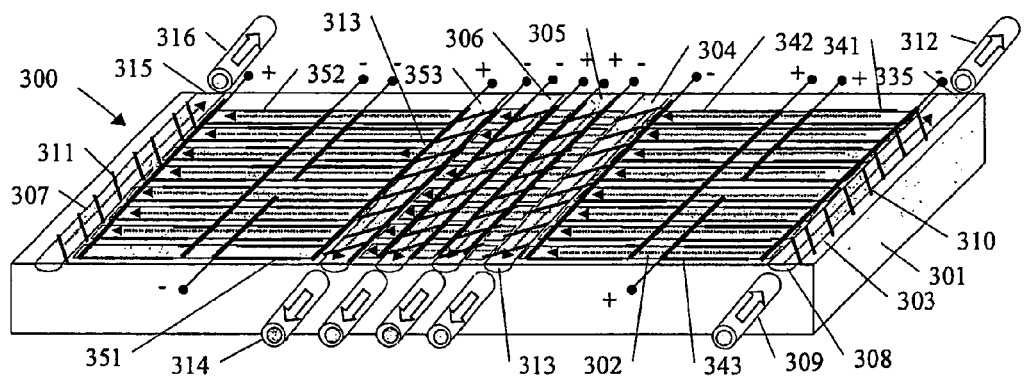
FIG. 3 is a representation of an integrated optical filter device having multiple optical outlets and different control electrode structures, constructed and operative in accordance with a further embodiment of the present invention.
Figure 11:
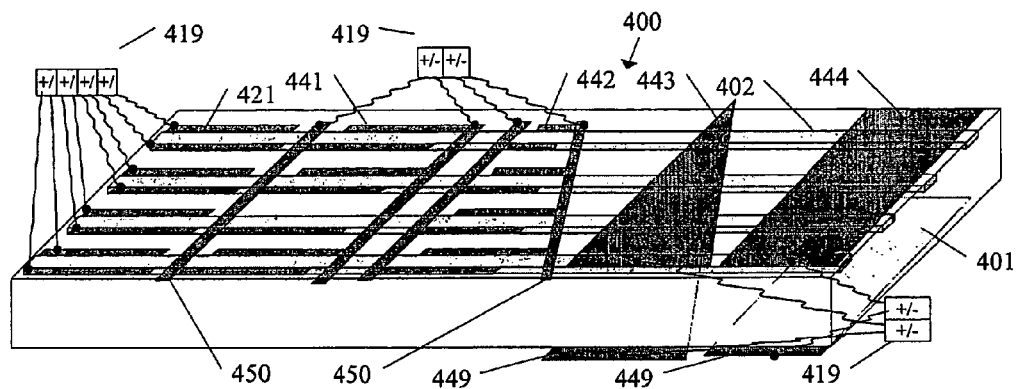
FIG. 11 is a representation of an integrated optical filter device in accordance with an embodiment of the present invention, employing electro-optical tuning to select the working wavelength.
Figure 12:
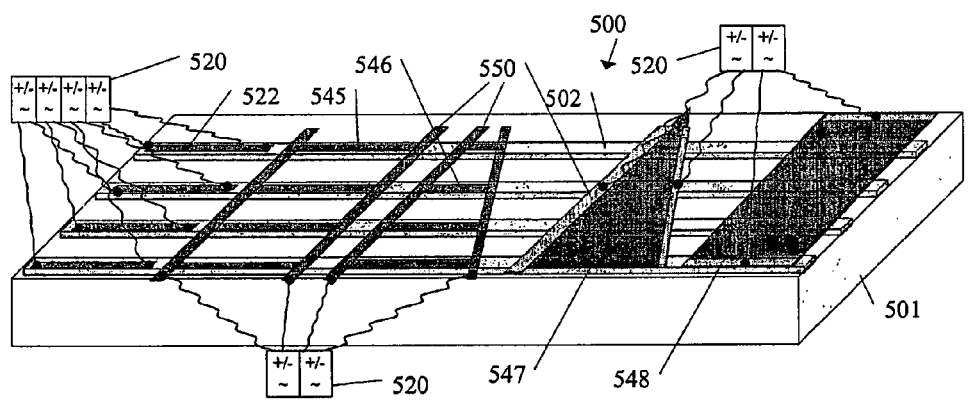
FIG. 12 is a representation of an integrated optical filter device in accordance with an embodiment of the present invention, employing thermo-optical tuning to select the working wavelength.

Referring now to FIG. 3, there is shown a schematic representation of an integrated optical filter device, referred to generally as 300, constructed and operative in accordance with the present invention, showing examples of different tuning electrode geometries that may be employed to provide the tuning capability to optical filter 300. Electrodes which are all of the same length 341 and 351 or of varying lengths 342 and 352 may be used to provide different measures of control over the variation in the index of refraction in the strip optical waveguides. Electrodes may be grouped 341 and 343 to simplify the connections and the routing of the control signals in the device. Other variations in electrode geometry and configuration are shown in FIGS. 11 and 12 and are discussed below. Analogous variations in electrode geometry may be employed with heating electrodes (not shown) to provide tuning by the thermo-optical effect.

The advantages of the present invention can best be appreciated by examining the spectral dependence of the light intensity transmitted by optical filter 100 shown in FIG. 1. For simplicity, it is assumed that losses are negligible, and the notation A generally refers to input strip optical waveguide 103 and the input side, and B generally refers to output strip optical waveguide 104 and the output side. Additionally, the following notation is employed:

r—is the reflection coefficient of amplitude for guided wave,

R—is the reflection coefficient of energy for guided wave ($R=r^2$), $t=(1-r^2)^{1/2}$—is the amplitude transmission coefficient for guided wave, $T=(1-R)$—is the transmission coefficient of energy for guided wave, σ is the phase difference between the reflected and transmitted light that comes to the reflector, M—is the number of reflectors, $x_m=dm$—is the position of the "m-th" reflector, d—is the periodicity of the reflector positions, N—is the effective refractive index of guided wave (Note that for the simplicity of the description, it is assumed to be the same for both incident and reflected beams.), λ—the wavelength of the light, and $k=2\pi N/\lambda$—is the wave number of the light.

The intensity of light transmission or throughput efficiency I(λ) of the device can be found by calculating the energy that comes from inlet window 108 to the outlet window 113, taking into account all the reflected and transmitted sub-beams of all the reflectors of sub-devices A and B.

The amplitude of transmitted light that passes through the m-th reflector can be derived as:

$$U_{aim}=U_0 t^{m-1} e^{ikd(m-1)}, m=1,2,3,\ldots M. \quad (1)$$

where $U_0$—is the amplitude of the incident light that comes to the first reflector of sub-device A.

The amplitude of reflected light from the m-th reflector can be derived as:

$$U_{arm}=re^{i\sigma}U_{atm}=U_0 rt^{m-1}e^{ikd(m-1)+i\sigma}, m=1,2,3,\ldots M. \quad (2)$$

The portion of energy that reaches outlet window 113 of sub-device B corresponding the m-th reflector of the sub-device A has the form:

$$U_{brm}=re^{i\sigma+ikL}U_{arm}=U_0 r^2 t^{2(m-1)} e^{i2kd(m-1)+i2\sigma}, m=1,2,3,\ldots M. \quad (3)$$

Taking into account that all of the reflected sub-beams of sub-device A are partially reflected and transmitted by multi-reflectors of sub-device B before coming to outlet window 113, the total optical field at the output of the sub-device B is the sum of all sub-beams, given by:

$$U_{br}=\sum_{m=1}^{M} U_{brm} = U_0 r^2 e^{i2\varphi}\sum_{m=1}^{M} t^{2(m-l)}e^{i2kd(m-l)} \quad (4)$$

Equation (4) is a geometric regression and can be derived in explicit form; namely:

$$U_{br}=U_0 r^2 e^{i2\sigma}[1-T^N e^{i2kdM}]/[1-Te^{i2kd}] \quad (5)$$

Thus the throughput efficiency I(λ) can be derived as:

$$I(\lambda)=|U_{br}/U_0|^2=R^2[(1-T^M)^2+4T^M \sin^2(kdM)]/[R^2+4T\sin^2(kd)], \quad (6)$$

where T=1−R.

From equation (6), it is easily seen that the device has a set of super narrow sub-passbands or subzones δλ at the wavelengths $\lambda_m$:

$$\lambda_m = 2dN/m_\lambda, \quad (7)$$

$$\delta\lambda = \lambda^2/(2NdM). \quad (8)$$

where $m_\lambda$ is an integer indicating a particular order of interference (for example, $m_\lambda$=20, at λ=1.54 μm, μm, d=7 μm, N=2.2).

At these points the efficiency is very high:

$$I(\lambda_m)=(1-T^M)^2. \quad (9)$$

For example, for the case M=1000 and R=0.002, η=0.74. Thus, the proposed device can simultaneously have high efficiency, super-narrow sub-passbands, and very small dimensions (Md=0.7 cm).

Figure 4:
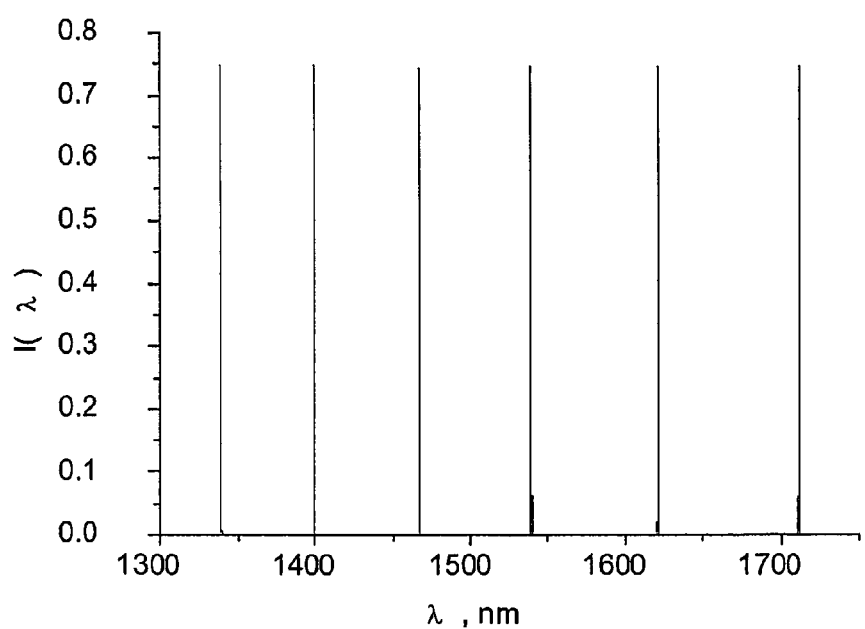
FIG. 4 is a graphical representation of the dependence of intensity of the light transmission of an optical filter in accordance with a preferred embodiment of the present invention as a function of the optical wavelength.
Figure 5:
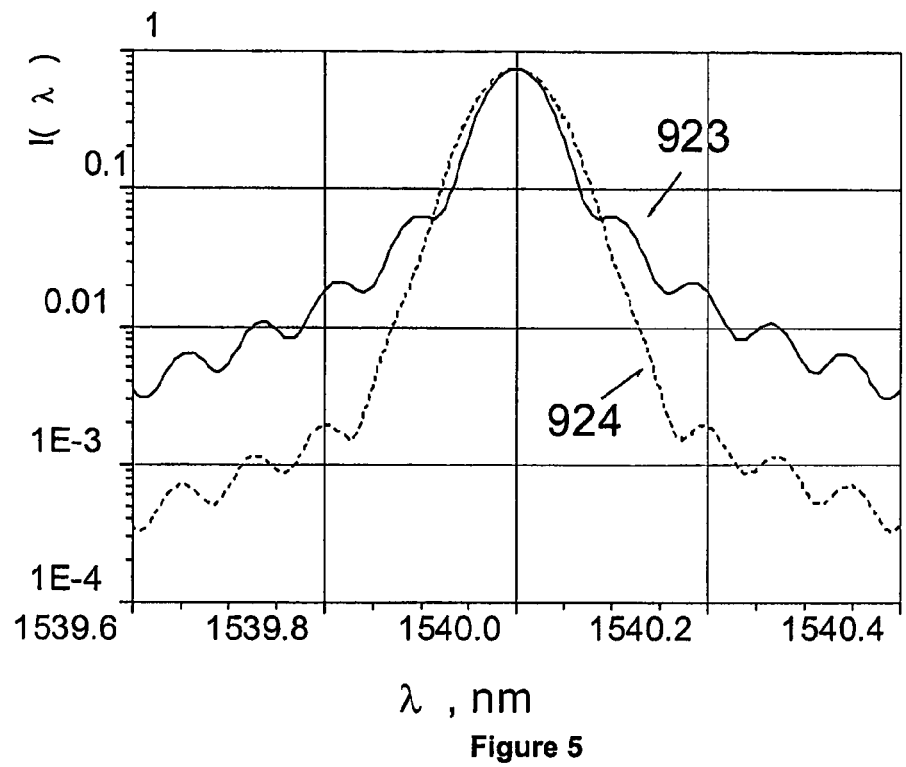
FIG. 5 is a graphical representation of the dependence of the light transmission of an optical filter as a function of the optical wavelength for constant and for variable coefficients of reflection of elementary reflectors of the optical inlet and outlet, in accordance with a preferred embodiment of the present invention.

FIGS. 4 and 5 illustrate the results of the above calculation, showing a spectrum curve of the throughput efficiency I(λ) of the optical filter 100, wherein FIG. 4 shows light intensity transmitted over a broad range of wavelengths, and FIG. 5 is fine, detailed spectrum for one peak such as those in FIG. 4. It is clear that optical filter 100 transmits a set of narrow subzones (δλA=0.08 nm at the 0.5 level), corresponding to the different orders of interference $m_\lambda$. Thus, according to equation (7), the distribution of elementary reflectors is fabricated so that for light of the working wavelength, the difference of phases on paths from inlet window 108 to outlet window 113 of the device for the majority of sub-beams reflected from various elementary reflectors 110, 111 are essentially multiples of 2πC.

A working subzone ($m_\lambda$) may be selected by an external broadband optical entry filter and/or by choosing a particular wavelength band for data transmission, such as near 1.54 microns for standard fiber optical network transmission. For example, in the present configuration, for the subzone corresponding to $m_\lambda$=20, the working wavelength is close to 1.54 microns. The analysis that follows will refer to this subzone and working wavelength, since it is commonly used in fiber-optical networks, because it falls in the working range of wavelengths (1530–1565 nm) for many commonly used optical amplifiers. It should be noted, however, that the conclusions of the following discussion are equally applicable to other wavelength bands, since the working parameters derived; for example, the transmitted linewidth (see equation (8)), depend only on the light wavelength.

In order to enhance the suppression of undesired signals outside the passband of optical filter 100, the elementary reflectors 110 and 111 of the input and output strip optical waveguides 103 and 104 respectively can be fabricated to have different coefficients of reflection, varying spatially from a maximal value in the center portion of the strip waveguide to lower values at its ends. The variation of the value of the coefficients of reflection is chosen to optimize the transmission linewidth of optical filter 100 and the suppression of sidelobes transmitted thereby. Good results are achieved using a limited Gauss function as the weighting function:

$$\psi(m)=\exp\{-C_2[(2m-M)/M]^2\}, m=1,2,\ldots M. \quad (10)$$

FIG. 5 is graphical representation of the transmission spectra of optical filter 100 for the case of a constant coefficient of reflection (curve 923) and for the varying case utilizing the limited Gauss function of equation (10) with weighing constant $C_2$ equal to 3 as the weighting function (curve 924). It is readily apparent that the chosen weighting function produces significant improvement of suppression of spurious sideband signals with no significant broadening of the linewidth in the passband. In the present example, the linewidth is about 0.1 nm on the −3 dB level, 0.17 nm on the −10 dB level, and 0.27 nm on the −20 dB level.

Figure 6:
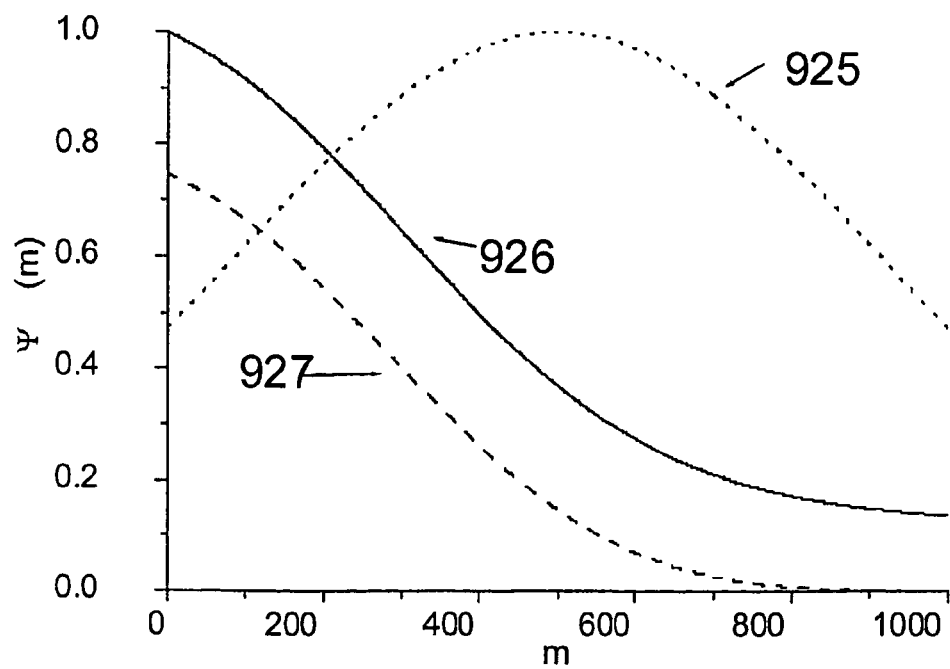
FIG. 6 is a graphical representation of the dependence of the guided wave amplitudes in the vicinity of elementary reflectors as a function of the sequence number (or position) of the elementary reflector.

A graphical representation of the guided wave amplitudes in the vicinity of elementary reflectors as a function of the sequence number (or position) of the elementary reflector is shown in FIG. 6. Curve 926 represents the dependence of the amplitude of the optical field of an incident guided optical mode that passed through strip optical waveguide 103 of the inlet as a function of the sequence number of elementary reflectors having variable coefficients of reflection. Curve 927 represents the dependence of the amplitude of the optical field of a guided mode of strip optical waveguide 104 of the outlet as a function of the sequence number of the elementary reflectors, wherein outlet window 113 in FIG. 1 corresponds to m=0. Curve 925 represents the dependence of the guided wave amplitudes in waveguide array 102 as a function of their sequence number, which corresponds to the weighting function ψ(m). Thus, curve 925 shows ψ(m) for the case of the limited Gauss function of equation (10) with the weighting constant $C_2$ equal to 3. In the case of elementary reflectors with a constant coefficient of reflection, the weighting function has the well-known exponential dependence and is not shown in the graph.

Figure 7:
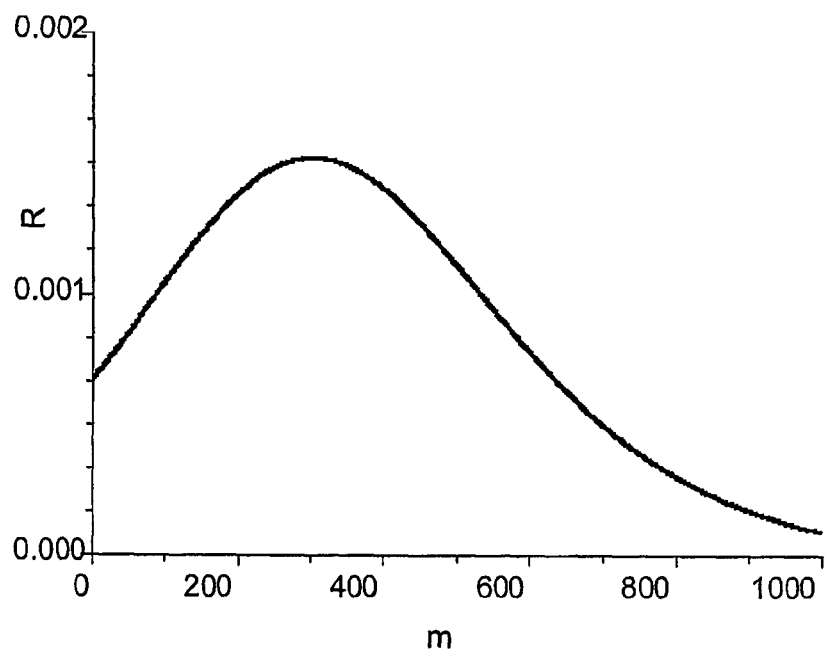
FIG. 7 is a graphical representation of the dependence of the coefficient of reflection the elementary reflector as a function of the sequence number (or position) of the elementary reflector.

FIG. 7 shows a graphical representation of the dependence of the coefficient of reflection as a function of sequence number (or position) of the elementary reflectors for the case yielding the dependence of the weighting function represented in curve 925 in FIG. 6. In order to obtain high sidelobe suppression, the values of the coefficients of reflection need to be higher near the center of output strip optical waveguide 104, decreasing to lower values at the ends thereof.

The use of an external broadband optical entry filter is not desirable in all cases, although the suppressed signal band is great enough to span a number of subzones. In such cases, the reflectors of both the optical input and output may be spaced over differing intervals. The positioning of the reflectors may be chosen, by methods known in the art, in order to optimize suppression of spurious sideband signals. For example, instead of a periodic arrangement of reflectors, a pseudo-random distribution of the spacing interval ($d_0$ above) may still be chosen to ensure phase differences of $\pi$ for light sub-beams reflected from different elementary reflectors. When displacement of reflectors is considered for both the input and output strip optical waveguides 103 and 104, the various sub-beams will again be shifted by $2\pi$.

For a case wherein the tilt of the reflectors is at an angle equal to 45 degrees, the value of step $d_0$ is equal to a half of working optical wavelength of the optical filter divided by the effective refractive index N of the appropriate strip optical waveguide. Such an arrangement of reflectors will result in coherent addition of sub-beams created by various reflectors only for light of the working wavelength of the optical filter. For other light wavelengths that differ from the working wavelength by more than a specified amount, the resulting field from the superposition of the sub-beams coming from various reflectors having the varying phase shifts will be negligibly small.

This type of optical filter can be simulated numerically using the above formalism by including a pseudo-random arrangement of elementary reflectors in equation (4):

$$x_m = dm + d_0 A_m, m = 1,2,3, \ldots M, \qquad (11)$$

where $d_0 = 0.5\lambda/N$—is the step of pseudo-random layout of reflectors, $A_m$—is a set of integers $(0, \pm 1, \pm 2, \ldots \pm M_0)$ which vary with randomly from $-M_0$ up to $+M_0$, and where $M_0$—is the multiplicity factor of a pseudo-random layout of reflectors. Note that $M_0$ should be less than the ratio $2d/d_0$. To generate a pseudo-random sequence, the following expression is utilized:

$$A_m = \text{Integer}(M_0 \sin(C_3 m^2)), \qquad (12)$$

where $C_3$—is a parameter which in our case is $C_3 = 400$.

Figure 8:
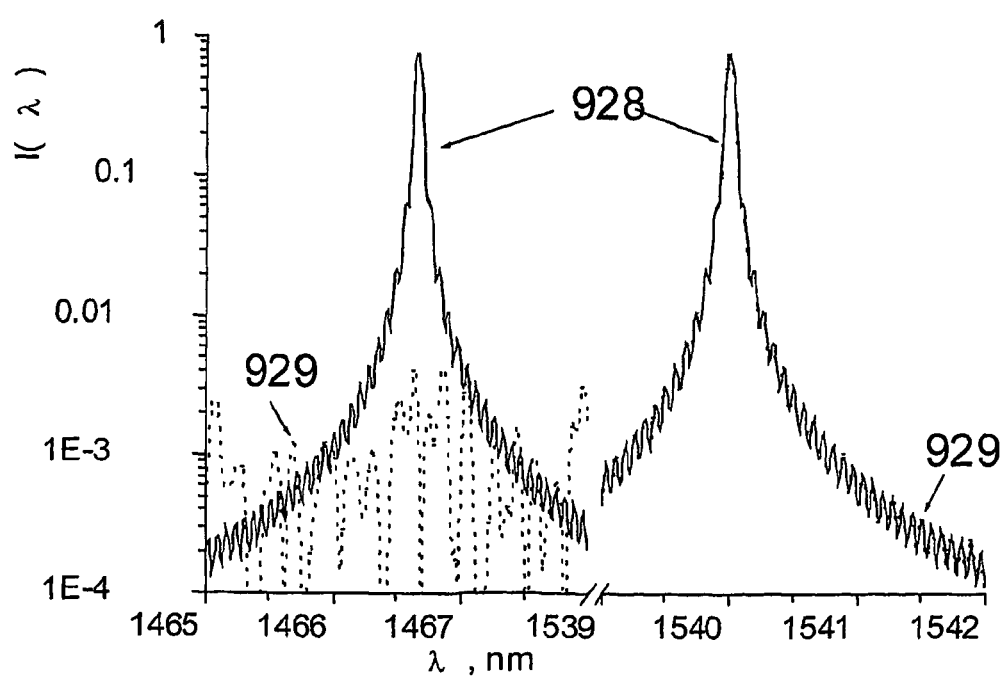
FIG. 8 is a graphical representation of the dependence of intensity of the light transmission as a function of the optical wavelength of an optical filter in accordance with a preferred embodiment of the present invention, wherein the spacing interval of the elementary reflectors varies.

In FIG. 8, a graphical representation of the transmission spectra of the optical filter for periodic (curve 928) and pseudo-random (curve 929) arrangements (with a multiplicity factor equal to 8) of tilted reflectors 110 and 111 of input and output strip optical waveguides 103 and 104 are shown in a semi-logarithmic scale. From the full range of the wavelengths and passbands covered by the optical filter, two selected ranges, around 1.47 microns and 1.54 microns, which correspond to maximum transmittance of the optical filter for the two interference orders $m_\lambda = 21$ and $m_\lambda = 20$, are shown. It should be noted that the shape of curve 928, which corresponds to a strictly periodic layout of elementary reflectors with a period of 7 microns, does not noticeably vary with a change in the subzone number (or interference order $m_\lambda$). However, when the elementary reflectors are arranged in varying intervals from one another (curve 929), the optical filter will only transmit in a range around a single working light wavelength. Near the working wavelength, in the present example 1540 nm corresponding to $m_\lambda = 20$, curves 928 and 929 are nearly identical, while near the other subzone, around a wavelength of 1466.67 microns corresponding to $m_\lambda = 21$, the magnitude of the transmitted signal as shown in curve 929 is suppressed by more than $-20$ dB in comparison with that shown in curve 928.

Thus the pseudo-random arrangement of elementary reflectors provides, according to equations (11) and (12), a coherent addition of sub-beams created from various reflectors, only at the vicinity of a single working wavelength of light. For all other wavelengths removed from the working wavelength, the resulting field from the superposition of sub-beams coming from the various reflectors, has a chaotically delayed phase shift, resulting in a negligibly small transmission. For the more general case, the arrangement of elementary reflectors may have aperiodically variable positions which can be chosen by optimization procedures known in the art in order to provide the required suppression of undesired sub-zones around the desired band of suppression.

Consider now optical filter 200 shown in FIG. 2, having a number of output optical strip waveguides 204, 205, and 206 wherein the elementary reflectors 221 of each are arranged to select a different working wavelength. According to equation (7), the working wavelength of the optical filter of the present invention will be determined by the effective refractive index of strip optical waveguides N and arrangement of reflector spacings d along the axis of the strip waveguide. Therefore, any change of the wavelength of the filtered light ($\delta\lambda = \delta N/N = \delta d/d$) can result in constructive interference, for a suitable change in the parameters of the filter, such a change in a refractive index $\delta N$ or in the arrangement of the elementary reflectors ($\delta d$); thereby changing the working wavelength of optical filter 200. The former case of a change in refractive index can be induced by electrostatic fields created by tuning electrodes 217 or 218 as described above with respect to electrodes 117 or 118 in FIG. 1.

Consider now the case wherein, for final output optical strip waveguide 207, elementary reflectors 211 are fabricated with substantially the same arrangement as elementary reflectors 210 of input optical strip waveguide 203. It can be shown that the phase shift for a given sub-beam will not vary significantly with a change in the wavelength of the light. Thus, this path will transmit a broadband (more than 60 nm) optical signal.

In the present example, based on FIG. 2, there is an optical filter device 200 having a number of output optical strip waveguides 203–207, each with a different working wavelength. The operation of optical filter device 200 can be analyzed by computer simulation.

Figure 9:
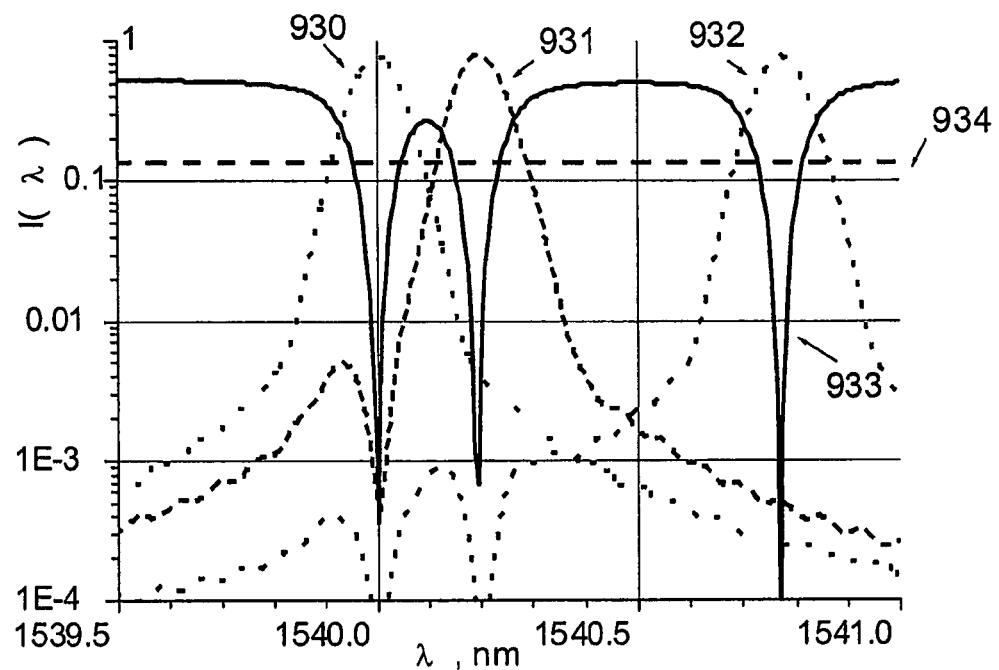
FIG. 9 is a graphical representation of the dependence of intensity of the light transmission of a multi-channel optical filter as a function of the optical wavelength.

Referring now to FIG. 9, there is shown a graphical representation of the transmission spectra of the multichannel optical filter device 200 shown in FIG. 2. Herein 930 is channel 1 (drop1), 931 is channel 2 (drop2) 932 is channel 3 (drop3), 933 is the passed signal (through), and 934 is the check signal (out). The device has one optical input 208, three outputs 213 for different wavelengths of light (drop), one output (through) 215 of the waveguide 207 for the not filtered radiation and one output (out) 235 of the waveguide 203 for a control signal based on the level of the entering optical radiation. The device was optimized for a number of parameters such as: narrow linewidth, high efficiency of the filtered optical radiation, large suppression of sidelobes, small sizes and high rejection of filtered wavelengths. Optimizing the combination of requirements results in a device with the following parameters: the number of reflectors—1000, period of layout of reflectors—7 microns, constant of weighing—3, product R×M for strip waveguides 203–206 is equal to 3, product R×M for strip waveguide 207 is equal to 7; the refractive index of waveguides 203, 204, and 207 is equal to 2.2; the refractive index of strip waveguide 205 is increased by 0.025%; the refractive index of strip waveguide 206 is increased by 0.1%. It provides the light filtering with efficiency 78% on three wavelengths: 1540.0 nm (curve 930), 1540.2 nm (curve 931), 1540.77 nm (curve 932). Linewidth on a −3 dB level is equal to 0.11 nm; on a −10 dB level is equal to 0.21 nm and on a −20 dB level is equal to 0.27 nm. Efficiency of passing of the not filtered radiation (see curve 933) is equal to 52%. The portion of energy of an entry beam that comes up to the end of the waveguide 203 (see 934) does not depend on wavelength of light and is about 14%. Once again note that according to equation (7), the above-mentioned change of wavelengths of the filtered radiation ($\delta\lambda/\lambda$) can result in constructive interference, i.e. caused by change of parameters of strip waveguides (change of a refractive index $\delta N$) and/or equivalent ($\delta\lambda=\delta N/N=\delta d/d$) change of period ($\delta d$) of layout of elementary reflectors along an axis of the strip waveguide, and induced by the application of an external electrical field.

In general, the number of optical channels is limited by the technological possibility of coupling a multiplicity of fiber and strip waveguides. In particular, on a chip of a lithium niobate 1×1 cm$^2$, the creation of the optical filter on 48 and more channels located with a period of 175 microns, and with a step in frequency between channels of up to 0.2 nm (25 GHz) is possible with known fabrication technology.

It should be noted that the properties of the material impose physical limitations on the value of possible induced change of the refractive index (i.e., no more than 0.1%) due to electro-optic or thermo-optic effects. Therefore, tuning the wavelength of optical filter device 200 represented in FIG. 2 is possible only within the limits of the adjacent optical wavelength channels. Electrodes 222 can provide a large tuning range, but this requires a multi-channel voltage source with the number of tunable channels equal to the number of tuning electrodes.

Consider now the case of tunable optical filter 300 shown in FIG. 3, having a number of output optical strip waveguides 304, 305, 306, 353 and 307 wherein the elementary reflectors 311 of each are arranged to select a different working wavelength. For convenience, FIG. 3 describes only the case with electro-optic tuning, but other tuning methods may be employed. Tuning of the device may be provided by different electrode arrangements. Electrodes 313, by external electric field, induce a change of the waveguide refractive index $\delta N_d$ and thus provide individual tuning (in a small range) of the optical wavelength dropped by outlet 305, 306 and 353. Electrode structures 342 and 352, with linear varying length of electrode overlap that increases by step $\Delta L$, and electrode structures 341 and 353, with constant length $L_C$ of electrode overlap, work as analog-digital phase shift scanners and provide (I removed the "s" because seems to refer to the above electrode structures 342, 452, 341 and 353) wide-band tuning of all dropped wavelengths simultaneously.

If the applied voltage to the electrode structures 341 and 351 induces the change of the waveguide refractive index $\delta N_{Cp}$, where p is the number of the electrode sub-section, and the applied voltage to the electrode structures 342 and 352 induces the change of the waveguide refractive index $\delta N_L$, that is, provides a linear phase change between optical channels within any desired electrode sub-section; then for any given value of $\delta N_L$ one can find the values $\delta N_{Cp}$ that will provide linear change of the phase shift (or that differ by an even number of $\pi$) between adjacent sub-sections and thus will provide linear change of the phase shift for all the adjacent optical channels of the total device. Thus, the arrangement of electrode structures with variable constant electrode overlap provides a wide range phase shift scanner, where an analog (continuously changing) signal is applied to the electrodes 342 and 352 and digital (discretely changing) signal is applied to the electrodes 341 and 351. For simplification of the discussion, one can determine the effective (or equivalent) value $\delta N$ that is responsible for the optical wavelength tuning ($\delta\lambda/\lambda=\delta N/N$) of the device 300:

$$\delta N=\delta N_d+\delta N_L\Delta L/d. \quad (13)$$

According to equation (13), the ranges of change $\delta N$ and, therefore, the range of change of working wavelength is increased in $\Delta L/d$ times. Thus, the device functions as an analog-digital scanner (ADS) providing wide band tuning of the optical wavelength by increasing the $\Delta L$ and the number of electrode sub-sections 341 and 351.

Based on the above description, the functioning of tunable optical filter 300 shown in FIG. 3 may be described as follows. Multi-wavelength optical signal comes through the input fiber 309 to the inlet 303 and splits between the strip optical waveguides 302 that contain phase shift arrangement 341 and 342. By applying the multi-voltage electric signal to electrode structures 341 and 342, it is possible to choose any desired optical wavelength that will be dropped by outlet 304. This simultaneously moves the filtered optical wavelength that will be dropped by other outlets that are placed on the optical pass after the ADS. Electric signals applied to electrode structures 313 independently tune (in a very small range) the optical wavelength dropped by outlets 305, 306, and 353. Other (non-dropped) optical wavelength pass through the second ADS based on electrode structures 351 and 352. It produces a reciprocal phase change in comparison to 341 and 342 thus totally compensates for any phase difference that may exist between different optical sub-beams on the pass from inlet 303 to outlet 307. Thus, all non-dropped optical wavelengths pass through the window 315 to output fiber 316.

In FIGS. 11 and 12, alternative electrode structures for the cases of electro-optic and thermo-optic tuning, respectively, are shown, referred to generally as 400 and 500. In FIG. 11, electrodes 443, 444, and 449 apply an electric field in a direction normal to the substrate 401 surface, with electrode 449 fabricated on the underside of substrate 401. In FIG. 12, although electrodes 522, 545 and 546 are strip-like and electrodes 547 and 548 are plate-like, the induced change of the strip waveguide refractive index due the thermal heating will tune filtering optical wavelength in a similar manner. It should be noted that it is expedient to fabricate summing electrode buses 550 with rather high conductivity to provide a homogeneous induced change of refractive index for all strip waveguides.

It should further be noted, that it is possible to further increase the tuning range of wavelengths of devices based on the present invention by employing both thermo-elastic and photo-elastic effects simultaneously, though this requires additional covering and/or electrode materials. In this case, the additional deformations of sub-surface layer caused by inhomogeneous temperature expansion or suppression, will induce additional change in the refractive index $\delta N$ and therefore, in $\delta\lambda$.

Figure 10:
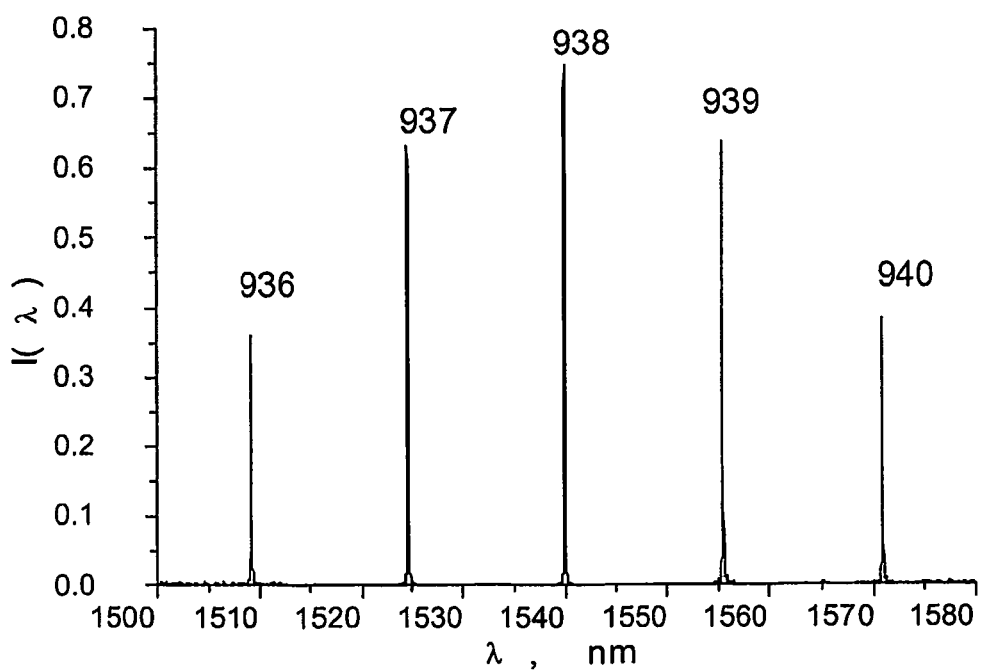
FIG. 10 is a graphical representation of the dependence of intensity of the light transmission of an optical filter employing control electrode structures as a function of the optical wavelength, in accordance with a further embodiment of the present invention.

Referring now to FIG. 10, there is shown a graphical representation of the transmission spectra of the multi-channel optical filter device 300 shown in FIG. 3 for different values of equivalent change $\delta N$ of the index of refraction. Namely; $\delta N$ =−2% corresponds to curve 936, $\delta N$=−1% corresponds to curve 937, $\delta N$=0 corresponds to curve 938, $\delta N$=1% corresponds to curve 939, and $\delta N$=2% corresponds to curve 940. This corresponds to working wavelengths varying from 1509.2 nm up to 1570.8 nm, or a tuning range of more than 60 nm.

It is worthy of note that the presently proposed optical filter device may be utilized for designing systems on the basis of dense wavelength-division multiplexing (DWDM) used in fiber-optical networks, and for the creation of a small-sized spectrometer of optical radiation; for example, in the creation of remote sensor devices, in order to determine the composition of gases, liquids, and solids.

The optical filter can be manufactured using known technology developed for creation of devices in integrated optics and microelectronics. The device may be fabricated of any transparent solid for which strip optical waveguides may be manufactured with small losses (on the order of 1 dB/cm or less). In order to provide the desired tuning capability, the materials must allow electronic manipulation of its refractive index due to, for example, electro-optical and thermo-optical effects. Known examples include lithium niobate and tantalate, semiconductor epitaxial layered structures AIIIBV, polymer waveguides, and multi-layered structures; for example, ZnO/SiO2/Si, etc. The easiest and most readily technically realizable case is a device based on optical waveguides of lithium niobate, having good optical and electro-optical properties.

It will further be appreciated by persons skilled in the art that the scope of the present invention is not limited by what has been specifically shown and described hereinabove, merely by way of example. Rather, the scope of the present invention is defined solely by the claims, which follow.

The invention claimed is:

1. An integrated optical filter device including:
   an optical inlet including an input strip optical waveguide arranged to receive an entering optical beam and a beam distributor in association with said optical inlet to divide the entering optical beam into beamlets each having a portion of the energy thereof;
   a processing array including a multiplicity of discrete optical channels arranged in association with said beam distributor so that each of said optical channels receives one beamlet of the optical beam therefrom and wherein each of said optical channels includes a substantially straight, tuning strip optical waveguide and a phase shift arrangement to selectably induce a preselected phase shift in optical waves as they traverse said optical channel;
   at least one optical outlet, each said optical outlet including a beam consolidator to combine beamlets of an optical beam from said channels of said array into an output optical beam and an output strip optical waveguide in association with said beam consolidator to receive the output optical beam therefrom and to direct it outwards;
   wherein said beam distributor and said channels of said processing array, together with said beam consolidator of one of said at least one optical outlet, are so arranged to cause superposition of the phase-shifted optical waves of beamlets of an optical beam from said channels of said processing array in said output strip optical waveguide of one of said at least one optical outlet, said superposition, as a result of said phase shifts induced in the optical waves by said phase shift arrangement, selecting portions of the optical beam having wavelengths within a predetermined range and combining them into an output optical beam in said output strip optical waveguide of one of said at least one optical outlet.

2. A device according to claim 1, wherein said beam distributor is a set of tilted elementary reflectors overlapping the aperture of said input strip optical waveguide.

3. A device according to claim 2, wherein said set of tilted elementary reflectors of said beam distributor is a set of groups of reflector strips.

4. A device according to claim 2, wherein said set of tilted elementary reflectors of said beam distributor have varying coefficients of reflection along the length of said input strip optical waveguide thereof, the values of the coefficients of reflection being generally higher near the center of said input strip optical waveguide and decreasing to lower values at the ends thereof.

5. A device according to claim 2, wherein said set of tilted elementary reflectors of said beam distributor is tilted at an angle of nearly 45 degrees with respect to the axis of said input strip optical waveguide.

6. A device according to claim 2, wherein said set of tilted elementary reflectors of said beam distributor is tilted at an angle of nearly 22.5 degrees with respect to the axis of said input strip optical waveguide.

7. A device according to claim 2, wherein said set of tilted elementary reflectors of said beam distributor are arranged in intervals that vary from one to another.

8. A device according to claim 1, wherein said beam consolidator is a set of tilted elementary reflectors overlapping the aperture of said output strip optical waveguide.

9. A device according to claim 8, wherein said set of tilted elementary reflectors of said beam consolidator is a set of groups of reflector strips.

10. A device according to claim 8, wherein said set of tilted elementary reflectors of said beam consolidator have varying coefficients of reflection along the length of said output strip optical waveguide thereof, the values of the coefficients of reflection being generally higher near the center of said output strip optical waveguide and decreasing to lower values at the ends thereof.

11. A device according to claim 8, wherein said set of tilted elementary reflectors of said beam consolidator is tilted at an angle nearly 45 degrees with respect to the axis of said output strip optical waveguide.

12. A device according to claim 8, wherein said set of tilted elementary reflectors of said beam consolidator is tilted at an angle of nearly 22.5 degrees with respect to the axis of said output strip optical waveguide.

13. A device according to claim 8, wherein said set of tilted elementary reflectors of at least one said beam consolidator of said at least one optical outlet are arranged in intervals that vary from those of said beam distributor and from those of other said beam consolidators of other said optical outlets.

14. A device according to claim 8, wherein said set of tilted elementary reflectors of at least one said beam consolidator of said at least one optical outlet are arranged in intervals that vary from one to another.

15. A device according to claim 1, wherein said at least one optical outlet is a sequence of said optical outlets arranged along the path of the optical beam and wherein said processing array is divided into stages wherein each of said stages is associated with one of said sequence of optical outlets.

16. A device according to claim 15, wherein, in each of said sequence of said optical outlets, said beam consolidator is substantially a mirror image of said beam distributor of said optical inlet.

17. A device according to claim 15, wherein, in the last optical outlet of said sequence of said optical outlets, said set of tilted elementary reflectors of said beam consolidator is substantially parallel to said set of tilted elementary reflectors of said beam distributor.

18. A device according to claim 1, wherein said phase shift arrangements of said channels of said processing array include control electrodes arranged in association with and along said tuning strip optical waveguides.

19. A device according to claim 18, wherein each of said tuning strip optical waveguides has arranged in association therewith one of said control electrodes, which is connected by its ends to a channel of a tunable multi-channel voltage source.

20. A device according to claim 18, wherein each of said tuning strip optical waveguides has arranged in association therewith two of said control electrodes which are connected to a channel of a tunable multi-channel voltage source.

21. A device according to claim 18, wherein said control electrodes associated with said tuning strip optical waveguides are arranged substantially along the full length thereof.

22. A device according to claim 18, wherein said control electrodes associated with said tuning strip optical waveguides are arranged along varying partial lengths thereof.

23. A device according to claim 18, wherein said tuning strip optical waveguides are joined in groups and wherein at least one of said control electrodes is arranged in association with all members of at least one of said groups.

24. A device according to claim 1, wherein said optical inlet further includes an inlet phase shift arrangement in association with said input strip optical waveguide to selectably induce a preselected phase shift in optical waves as they traverse said input strip optical waveguide.

25. A device according to claim 1, wherein at least one of said at least one of optical outlets further includes an outlet phase shift arrangement in association with said output strip optical waveguide to selectably induce a preselected phase shift in optical waves as they traverse said output strip optical waveguide.

26. A device according to claim 24, wherein said inlet phase shift arrangement includes inlet control electrodes arranged in association with and along said input strip optical waveguide.

27. A device according to claim 26, wherein said input strip optical waveguide has arranged in association therewith one of said inlet control electrodes which is connected by its ends to a channel of a tunable multi-channel voltage source.

28. A device according to claim 26, wherein said input strip optical waveguide has arranged in association therewith two of said inlet control electrodes which is connected by its ends to a channel of a tunable multi-channel voltage source.

29. A device according to claim 25, wherein said output phase shift arrangement includes outlet control electrodes arranged in association with and along said output strip optical waveguide.

30. A device according to claim 29, wherein said output strip optical waveguide has arranged in association therewith one of said outlet control electrode which is connected by its ends to a channel of a tunable multi-channel voltage source.

31. A device according to claim 29, wherein said output strip optical waveguide has arranged in association therewith two of said outlet control electrode which is connected by its ends to a channel of a tunable multi-channel voltage source.

32. A device according to claim 1, wherein said tuning strip optical waveguides are fabricated of an electro-optical material, and said phase shift arrangement induces said phase shift via the electro-optical effect.

33. A device according to claim 1, wherein said tuning strip optical waveguides are fabricated of a thermo-optical material, and said phase shift arrangement induces said phase shift via the thermo-optical effect.

34. A device according to claim 1, wherein said tuning strip optical waveguides are fabricated of a material that can receive charge carrier injection, and said phase shift arrangement induces said phase shift via injection of charge carriers.

* * * * *